United States Patent [19]
Henry

[11] Patent Number: 4,682,912
[45] Date of Patent: Jul. 28, 1987

[54] PIPE LAYING APPARATUS

[76] Inventor: John T. Henry, P.O. Box 1472, Ft. Collins, Colo. 80522

[21] Appl. No.: 214,500

[22] Filed: Dec. 9, 1980

Related U.S. Application Data

[63] Continuation-in-part of Ser. No. 56,456, Jul. 10, 1979, Pat. No. 4,362,435.

[51] Int. Cl.[4] ................................. F16L 1/02
[52] U.S. Cl. ...................... 405/154; 29/525; 29/DIG. 46; 405/182; 414/747
[58] Field of Search .......... 405/154, 182, 184; 29/426.6, 525, DIG. 46; 175/55, 56; 294/74, 103, 104; 414/745, 747

[56] References Cited

U.S. PATENT DOCUMENTS

| | | | |
|---|---|---|---|
| 3,163,458 | 12/1964 | Brandt | 414/745 X |
| 3,481,027 | 12/1969 | Bodine | 29/525 |
| 4,146,347 | 3/1979 | Woods | 405/184 |
| 4,209,269 | 6/1980 | Martinez | 405/154 |
| 4,266,819 | 5/1981 | Pemberton | 294/104 X |

FOREIGN PATENT DOCUMENTS 835050  2/1970  Canada ................................. 405/184

Primary Examiner—David H. Corbin
Attorney, Agent, or Firm—Hugh H. Drake

[57] ABSTRACT

For laying and joining successive sections of pipe, a vehicle is movable over a course along which the pipe is to be laid. Carried on the vehicle is a crane, the outer end portion of which is movable both vertically and horizontally relative to the course of the pipeline. A controllable grapple mounted on that outer end of the crane is engageable with a section of the pipe, so that operation of the grapple together with the crane enables each section of the pipe to be picked up, moved into position over and deposited along the course. A vibrator is attached to the grapple and serves to induce vibration thereinto and from the grapple into the section of pipe being carried. The vibration is induced as an end of the section carried by the grapple is slidably mated with another section of the pipe which lies along the course. The vibration also is used to assist in bedding the pipe section being laid.

4 Claims, 4 Drawing Figures

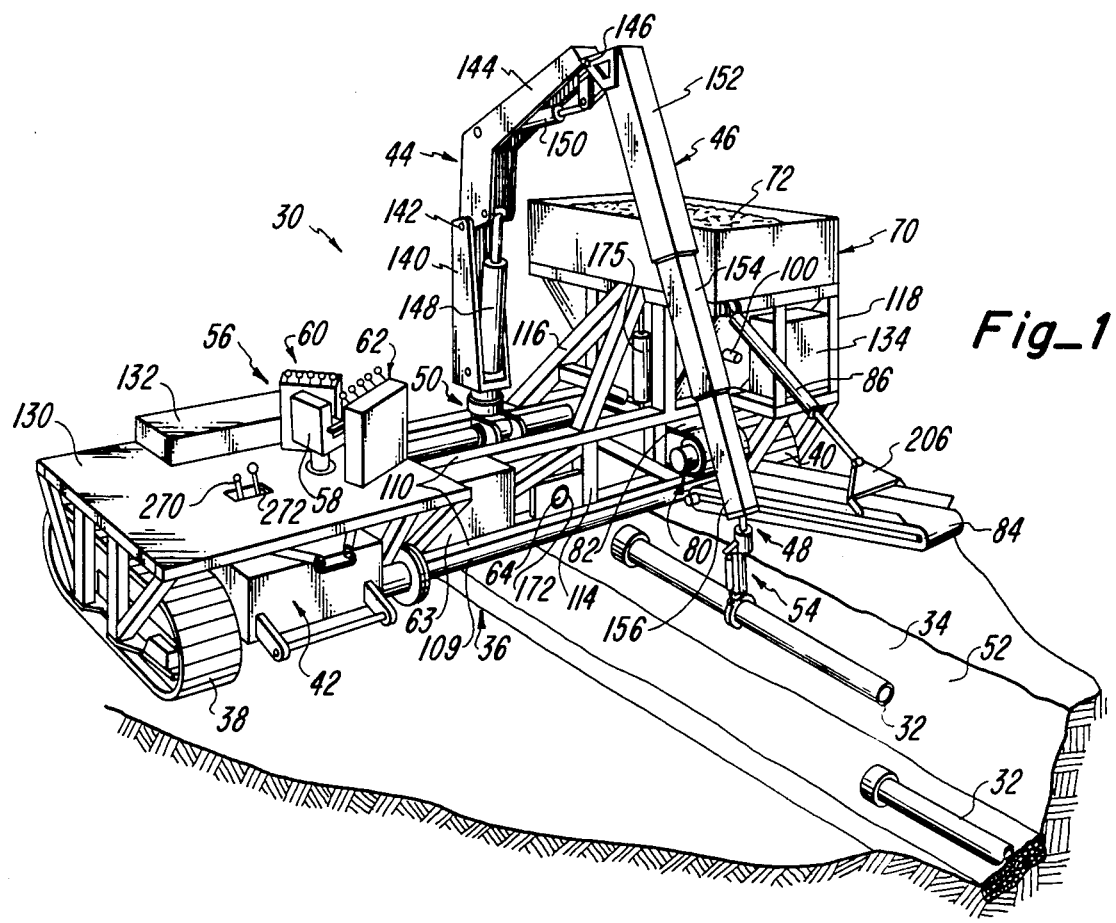
Fig_1
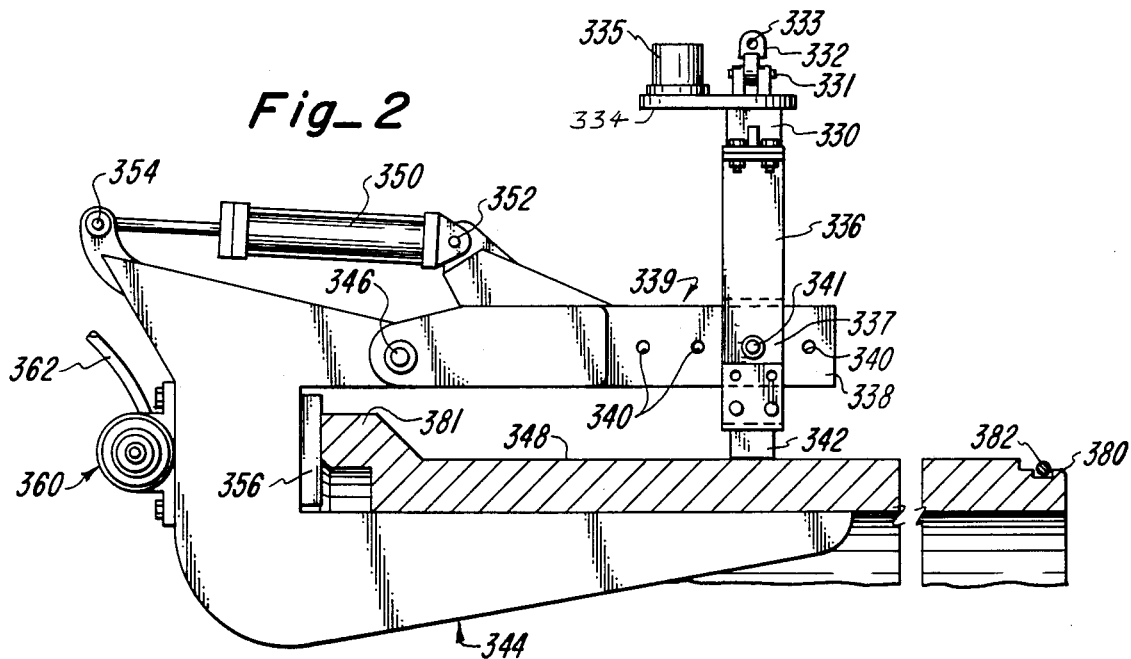
Fig_2

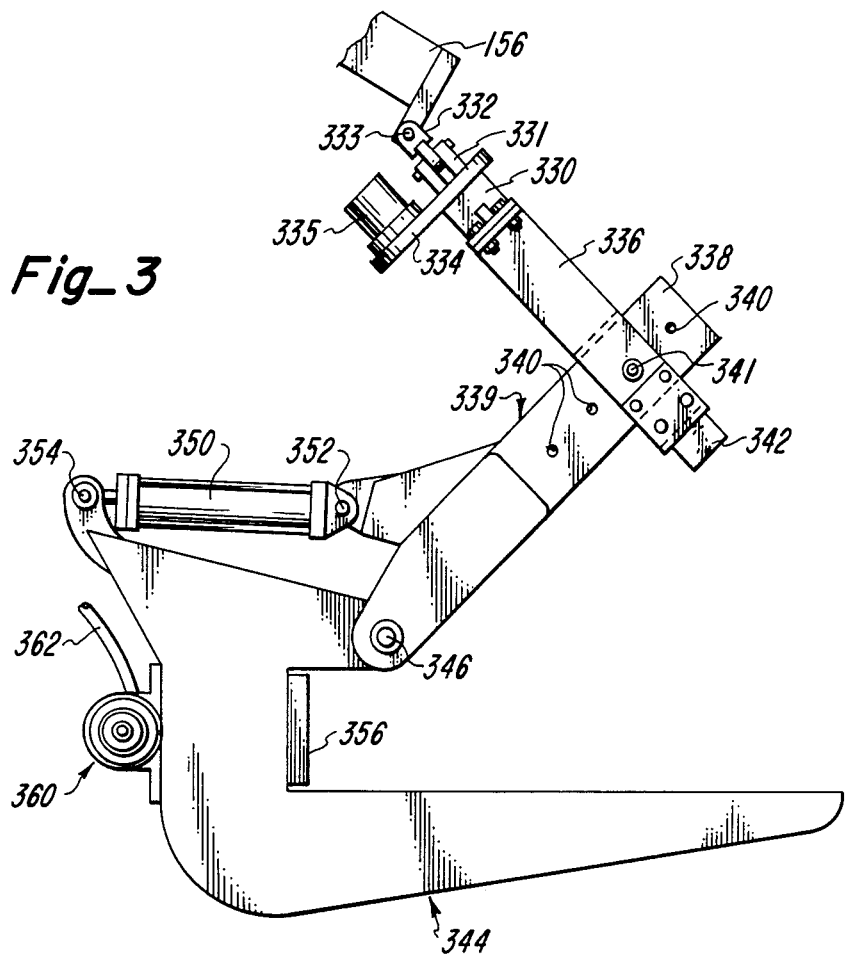
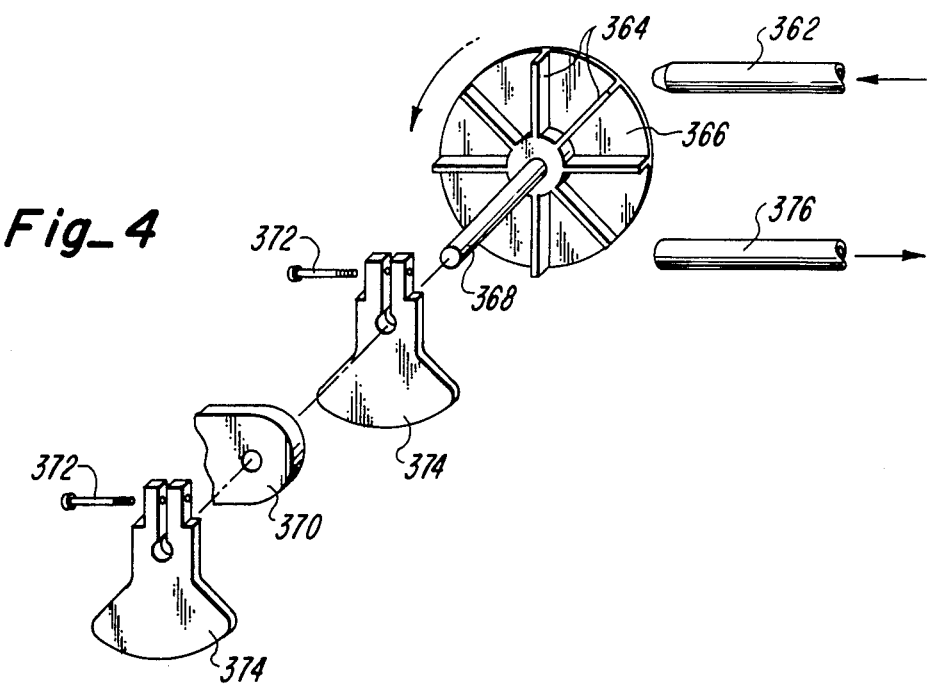

PIPE LAYING APPARATUS

RELATED APPLICATION

The present application is a continuation-in-part of co-pending parent application Ser. No. 056,456 U.S. Pat. No. 4,362,435 filed July 10, 1979, entitled "Apparatus for Laying Pipe" and by the same inventor.

The present invention pertains to pipe laying apparatus. More particularly, it relates to apparatus which not only handles the pipe sections but also facilitates their joinder and bedding.

The apparatus of the aforementioned parent application lays the pipe in a trench in order to enable the joinder of successive sections thereof. It includes an elongated carriage of a length sufficient to straddle the trench. The carriage is propelled along by engagement with the ground surface outward from respective upper sides of the trench and is steerable. A crane arises from the carriage and includes an adjustably articulated arm of adjustable length. An outer end portion of the crane is controllably movable both laterally with respect to the trench and between respective positions above and within the trench. The crane itself is so mounted upon the carriage as to permit tilting relative thereto and, thus, relative to the side walls of the trench. Mounted on the outer end of the arm of the crane is a controllable grapple arranged to engage and disengage the pipe.

Pipe sections capable of being handled in the field of operation concerned may have diameters ranging from between about four inches and as much as, perhaps, forty-eight inches or greater. Usually being made of a material such as steel, cast iron, concrete, or heavy plastic, each section may weigh up to several tons. A machine constructed in the manner described in the parent application has been used successfully to lay many miles of pipe of several different kinds.

In general, operation has been most satisfactory. A single operator seated upon the machine is able to pick up, move into position and join successive sections of the pipe as each, in turn, is laid into the trench. In practice, the operation has been so successful that a second workman has been kept very busy in replenishing the stock of pipe available to the machine and in refilling a hopper also included for the purpose of carrying and enabling the automatic dispensing of bedding gravel.

However, one particular kind of pipe has continued to pose difficulty in connection with the joinder of the successive sections. This particular species of pipe is formed of concrete and is formed outwardly at one end to define a bell into which a necked-down opposite end of a succeeding section of pipe is to be inserted. Re-enforcing steel bars are cast into the walls of the pipe as a result of which each section is extremely heavy. In one version having a twenty-seven inch inside diameter, one section weighs approximately twenty-six-hundred pounds. In a forty-eight inch version, a section weighs about fifty-six-hundred pounds.

The difficulty encountered has been associated with the attempt to insert the end of the following pipe within the bell of the preceding pipe. The problem is aggravated by reason of the inclusion of a neoprene gasket or O-ring seated in a recess which encircles the necked-down portion of the leading end that is to be inserted within the bell. Although the conventional practice of first coating that gasket with an industrial soap, to serve as a lubricant, is followed, it nevertheless has proved to be extremely difficult to insert the end carrying the gasket within the bell of the other pipe section.

Further complicating the situation is the presence in the bottom of the trench of the usually-required bedding gravel. As the operation proceeds, a few stones from that gravel often become lodged inside the flared or bell portion of the one pipe section. Of course, those obstruct the insertion of the necked-down portion within the bell. Additional difficulties arise from imperfect pipe, such as that which is out of round or includes "feathers" of the pipe material. Moreover, the bedding gravel often is not properly smoothed out and graded to serve accurately in definition of the seating for the pipe sections at its prescribed elevation and slope.

The result of the difficulty has often been that a workman must enter the trench at the last moment in order to make sure that the inside of the bell is cleared of all stones or other obstructions and, in view of the heavy weight of the pipe section then being laid, more powerful machinery, such as a large backhoe or jacks, must be brought on the scene to wrestle the new section into place with its necked-down portion properly positioned and seated within the bell of the preceding pipe section. Of course, that extra operation is costly both in terms of time and expense.

It is, accordingly, a general object of the present invention to provide a new and improved pipe laying apparatus which overcomes the aforenoted difficulties.

One specific object of the present invention is to improve performance of the machine described and claimed in the aforesaid parent application.

Another object of the present invention is to solve the difficulties above-discussed in a simple and efficacious manner.

A further object of the present invention is to provide a new and improved pipe laying apparatus that facilitates settling of the pipe in bedding material.

Still another object of the present invention is to provide new and improved apparatus which is adaptable to a variety of machinery that may be used for laying pipe.

Apparatus in accordance with one aspect of the present invention thus is intended for the laying and joining of successive sections of pipe. A vehicle is movable over a course along which the pipe is to be laid. Carried on the vehicle is a crane that has an outer end portion movable both horizontally and vertically relative to that course. Mounted from the outer end portion of the crane is a controllable grapple that is engageable with a section of the pipe. Operation of the grapple together with the crane enables a section of pipe to be picked up, moved into position over and deposited along the desired course. Also included is a vibrator mechanically coupled to the grapple. The vibrator induces vibration into the grapple and therefrom into a section of pipe carried by the grapple as an end of that carried section is slidably mated with another section of the pipe lying along the course. Other aspects of the invention include use of such a vibrator with different pipe-laying machinery.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is an isometric view of a pipe laying apparatus, for purpose of illustration, with which the improvements of this application are to be included;

FIG. 2 is a fragmentary side-elevational view of a grapple particularly suitable for use with the apparatus as shown in FIG. 1 and including such improvements;

FIG. 3 is a view similar to FIG. 2 but which has components differently positioned; and FIG. 4 is a fragmentary exploded isometric view of elements included within a component shown in FIGS. 2 and 3.

Shown in FIG. 1 is one form of apparatus that has been built and determined to operate successfully. Moreover, and subject to the addition of specific improvements to be discussed later, the machinery of FIG. 1 is fully disclosed in the aforementioned parent application. Accordingly, that parent application is incorporated herein by reference. Nevertheless, an explanation of the operation of such prior apparatus will first be given in order to permit a fuller understanding herein of the improvements to which this particular application is directed.

Apparatus 30 lays pipe sections 32 in a trench 34 and joins successive ones of sections 32. In addition, apparatus 30 aligns the sections, sets them to grade and beds them in place. An elongated carriage 36 is of a length sufficient to straddle trench 34. At each end portion of carriage 36 are propelling means, including tracks 38 and 40, that engage the surface of the ground on the berm out from respective upper sides of trench 34 and serve to move carriage 36 along the trench. Included within apparatus 30, in this case generally adjacent to track 38 at 42, is an engine and control system which serves to drive tracks 38 and 40 steerably along the length of trench 34.

A crane 44 rises upwardly from the central portion of carriage 36 and includes an adjustably articulated arm 46 of adjustable length and which has an outer end portion 48 controllably movable both laterally with respect to trench 34 and between respective positions effectively above the upper level of trench 34 and within the trench below the level of carriage 36. Crane 44 is secured by mounting means 50 with respect to carriage 36 so as to permit adjustable tilting of crane 44 relative to the sidewalls 52 of trench 34. A controllable grapple 54 is mounted at outer end portion 48 of arm 46 and is engageable with a pipe section 32.

Mounted on carriage 36 is a control station 56 located in a position that enables an operator, seated upon a chair 58 and using control panels 60 and 62, to govern and observe movement of grapple 54 and, ultimately at the bottom of trench 34, effect joinder of successive sections 32.

In this case, a successful initial embodiment of apparatus 30 was constructed from a commercial bulldozer. The assembly which included track 40 was severed from the original unit and spaced outwardly therefrom by means of carriage 36. The drive train components of the bulldozer were retained for supplying motive power to the tracks. A diesel engine in this case drives three hydraulic pumps which, in turn, supply fluid to a variety of hydraulic motors to provide operational power for a number of controllably movable components some of which are described in more detail in the parent application. The hydraulic system includes the usual reservoir 63 in which hydraulic fluid is stored.

The hydraulic fluid distribution is strictly conventional in approach and includes the usual system of piping, actuators and valves all under control of operating handles on panels 60 and 62. Ultimately, a variety of different hydraulically-operated motors and rams are caused to be operated through the control levers on panels 60 and 62 for various purposes within the apparatus. Thus, conventional hydraulic controls and feed systems are employed to enable the operator at control station 56 to adjust steering by means of control of tracks 38 and 40, to adjust articulation of arm 46 as well as the ultimate length of that arm, to adjust movement of the outer end of arm 46 both laterally and relative to the levels of trench 34 and carriage 36 and also to adjust lateral tilting of crane 44.

Mount 50 includes a pivot bearing at 64 within a mounting block secured to the central portion of carriage 36 and a coupling that supports crane 44, all to permit the aforementioned tilting of the crane. The coupling also permits swinging of crane 44 about a generally vertical axis and in a direction laterally of the trench.

The berms upon which tracks 38 and 40 ride are seldom at the same level. For safe, efficient and satisfactory operation, however, it is necessary that crane 44 be mounted so as to be able to assume a vertical orientation regardless of the level of carriage 36. Rather than attempt to level the entire machine, the block in which bearing 64 is defined constitutes an adjustable platform. That block is controllably adjustable in level about pivot 64 relative to carriage 36 and, thus, to the trench itself. On the other hand, crane 44 is the only element of the entire machine that is critical of orientation relative to the vertical.

As herein specifically embodied, all components of crane 44 disposed above pivot 64 are commercially available as a standard assembly normally intended for mounting on a truck bed. In fact, a single-ended pivot member in the base of that assembly for a different purpose could be made double-ended to serve as pivot 64 and eliminate the need for the block as a separate component.

Also mounted upon carriage 36, and in this case at the end thereof which includes track 40, is a hopper 70 for carrying a pipe bedding material 72, such as crushed stone or other fill, that is to be deposited into the trench. A shutter or gate is disposed at the bottom of hopper 70 in order adjustably to control dispensing of material 72 from the hopper.

For delivering material 72 from hopper 70 into trench 34, a conveyor system 80 is included. System 80 includes a first belt-type conveyor 82 that receives gravel or the like from the bottom of hopper 70 and may deliver it forwardly onto a second conveyor 84 also of the belt type and likewise hydraulically driven for movement. The outer end of conveyor 84 is swing-mounted from a ram 86 adjustable in length to control the relative level of the delivery end of the conveyed material. The inner end of conveyor 84 is pivotally mounted from carriage 36. Another ram, coupled between carriage 36 and the pivot mounting for conveyor 84, enables the latter to be swung between a position displaced to one side of trench 34 as shown in FIG. 1 and a position in which its outer end is disposed over the trench.

The symmetry of the machine enables the optional addition of a rearwardly extending conveyor which is, with respect to hopper 70 and conveyor 82, a mirror image of conveyor 84. That is, it is mounted and moved in the same way with respect to conveyor 82 and hopper 70. The rear conveyor may be used to deliver bedding material into the trench from the rear of apparatus 30. To that end, conveyor 82 is reversible in direction of transport of material from hopper 70.

All conveyors are driven by hydraulic motors adjustable as to speed by control valves on panels 60 and 62. Control of the rate of delivery of material received from the hopper and delivered by way of the conveyors into the trench is also governed, of course, by the amount of opening of the gate in the hopper, which also is controllable from panels 60 and 62.

As already indicated, the overall motive and driving power is derived from an engine which, in the particular case illustrated, is a diesel-fueled internal-combustion variety that, of course, exhausts hot outlet gases. Preferably, this heated exhaust fluid or gas is conveyed through tubing which runs through carriage 36 to hopper 70. That tubing which conveys those gases along the extent of the carriage is a hollow tube which also serves as a girder of the carriage. A coupling pipe is connected between the tubing and a rear wall of hopper 70 in a manner to lead the exhaust gases through a vent tube that extends somewhat centrally through the lower portion of hopper 70 and on outwardly from its forward wall to an ultimate exhaust outlet 100.

The vent tube includes a plurality of comparatively small-sized outlet openings that serve in use to permit the hot exhaust gases to escape into material 72 and melt any ice that has formed in cold weather. Moreover, the exhaust gases from the engine include a significant proportion of steam. The emission of that steam tends to condense on and humidify the aggregate, when that is the type of material within hopper 70. This serves to dampen the amount of dust in the aggregate as utlimately delivered by a conveyor into the bottom of the trench, where it otherwise might form a cloud that would obscure the vision of the operator seated upon chair 58.

Tracks 38 and 40 are mounted on the usual wheels. A light-weight version of the machine, useful for the laying of pipes in smaller sizes, could be mounted upon inflatable tires. It would be capable of laying (and joining) all underground pipe needed for a sub-division, for example. Again, only a single operator would be required to accomplish all of the tasks previously mentioned.

Station 56 includes a platform 130 mounted on top of driving unit 42 and on which chair 58 and panels 60 and 62 are mounted. As illustrated, the platform is supported by means of suitable braces and struts extending from carriage 36 and from the framework that supports track 38. At the rear of platform 130 is, in this case, a portion of a housing 132 for the upper portion of the engine. A fuel tank 134 is situated within the framework that supports hopper 70, that location being selected because of convenience in the particular embodiment; of course, that tank could be located elsewhere if desired.

Although the various different movements could be electromechanically controlled by other suitable known apparatus, it has already been indicated that such movement control in the embodiment illustrated is by means of hydraulics. That means that a variety of different hydraulic lines lead to and from control panels 60 and 62 to different parts of the apparatus and particularly to the various rams some of which have already been mentioned and others which will be identified hereinafter. For clarity, the various different hydraulic lines have not been shown in the drawings, although it will be understood that they are generally distributed along and through the different girders, braces and struts. Again, the implementation of such a hydraulic control system is strictly routine.

Except for its mount at 50 and the grapple which may be employed at 54, crane 44 in itself is of known construction as already indicated. In fact, in connection with the fabrication of the embodiment specifically shown in FIG. 1, crane 44 was a purchased part. It includes an upright stanchion 140 pivotally coupled at 142 to a forwardly bent section 144 which in turn is pivotally coupled at 146 to arm 46. A ram 148 pivotally coupled at its opposing ends between stanchion 140 and section 144 controls articulation as between those two members, while a ram 150 similarly is pivotally coupled between section 144 and arm 46 and controls the degree of articulation between that set of members. In addition, arm 46 is in this case composed of three different telescopic segments 152, 154 and 156, each slidable within the next and each including an enclosed ram adjustable to control the projecting of one from the next.

Ram 148 is effectively pivoted between a pinion and a pivot point located so as to achieve the previously described articulation. As shown and described in the parent patent, the pinion mates to a rack that serves to swing crane 44 back and forth in a direction laterally of trench 34.

Disposed beneath platform 130 is a preferred clutch and brake operating arrangement for the machine adapted. Like in most bulldozers, and particularly here for the purpose of providing accurate steering so as to assist avoiding inadvertent operation that might otherwise allow one of tracks 38 and 40 to fall into trench 34, a so-called skid-steer drive system is used. Either of tracks 38 or 40 at any time may be drivingly engaged, while either track may be operatively braked. As herein preferably employed, the skid-steering mechanism uses a combined and interrelated clutching and braking control of each of tracks 38 and 40. At, perhaps, greater cost, known proportional-type fully-hydraulic drives for driving each track may be substituted.

A pair of control levers 270 and 272 project upwardly from platform 130 in a position to be operated by the foot of the operator seated in chair 58. Those levers, as shown, only control normal gear-shifting and transfer between high and low ranges of the same. With a preferred complete hydraulic control of brake and clutch action, as is known, levers 270 and 272 may be omitted. As embodied, levers 270 and 272 have seldom been used, although they have provided an additional degree of flexibility.

FIG. 1 illustrates use of one kind of grapple 54 described in more detail in the parent application. It features a pair of jaws which are closable to be clamped around the mid-portion of a pipe section as shown. In the alternative, the patent application also depicts and describes a cable-secured form of grapple and a still different form of grapple known generally in the art as that of the "hairpin-type". It is the hairpin-type of grapple which is specifically shown in FIGS. 2 and 3 of the present application. That version of grapple is particularly adapted to pick up and balance types of pipe, such as those formed of concrete, that are more likely to fracture if they should be too tightly compressed by other kinds of grapples.

In FIG. 2, a vertical shaft 330 is pivotally coupled at 331 to a link 332 which, in turn, is pinned at 333 to the outer end of section 156 of crane 44. A chain drive within a housing 334 is coupled between shaft 330 and a hydraulic motor 335, so that shaft 330 is rotatable about a nominally-vertical axis as the entire grapple assemblage is suspended. Other rotary drives may be substituted as explained in the parent application.

Attached to the bottom and downwardly depending from shaft 330 is a leg 336 bifurcated over its lower end portion 337 to fit over an outer end portion 338 of a finger 339. A series of holes 340 spaced longitudinally along end portion 338 permit the securement of leg 336 at any of several different positions by the insertion of a bolt or pin 341. Projecting downwardly from the bottom of leg 336, in a position below finger 339, is a resilient pad 342.

A jaw 344 is pivotally coupled at 346 to the other end of finger 339 so that jaw 344 and finger 339 are swingable toward and away from one another with jaw 344 being suspended generally beneath finger 339. As shown in FIG. 2, jaw 344 has been inserted through the bell 381 of a pipe section 348 to thereby carry the pipe. A ram 350 is pivotally coupled at its respective opposite ends 352 and 354 between finger 339 and jaw 344 so as to effect the swinging of the jaw relative to the finger.

The grapple illustrated in FIGS. 2 and 3 is known in the field as a "hairpin". Jaw 344 has a length of at least one-half the length of pipe section 348 and a cross-sectional size sufficiently small to permit insertion of jaw 344 within one end of the pipe section. In the more usual "hairpin" in use prior to the parent application, finger 339 was rigidly affixed with respect to jaw 344, the only pivot being as at 331 or 333. The geometry was such that, with the pipe loaded on the jaw, the jaw hung in a substantially horizontal position. Without the pipe, however, the jaw (and the combined finger) tilted downwardly toward the closed end. Thus, a workman often had to be used to manually level the jaw as it was being inserted into or removed from a pipe section.

The inclusion of ram 350 and pivot 346 permits the orientation of jaw 344 to be leveled to the degree desired whether loaded or unloaded with a pipe section and regardless of variation in the angulation of outer section 156 of crane 44 relative to the horizontal. As illustrated in FIG. 2, wherein pipe section 348 is being supported in balance, ram 350 is extended. Without the load of the pipe section, as shown in FIG. 3, ram 350 is contracted to maintain the level of jaw 344 for the same angulation of section 156. On any change in the angulation of section 156, ram 350 may be changed in length to keep jaw 344 at level. That is, control of the degree of jaw opening affords adjustment of the level of jaw 344 in both the loaded and unloaded conditions. Moreover, that adjustment may be used to enable the jaw to be "scooped" into or out of the end of a pipe section, as when an obstruction, such as a turn in the trench, limits the room available for moving the jaw within the pipe.

Preferably, a resilient pad 356 is mounted at the closed end of the jaw assembly. If desired, and as more fully explained in the parent application, the position of pad 356 may be adjustable in a direction lengthwise of jaw 344. Both that degree of adjustability, and the adjustment afforded by selection among the different ones of holes 340, permits variation in the center of gravity of the overall finger and jaw assembly as may be desired in connection with the handling of different kinds and lengths of pipe sections. As also mentioned in the parent application, resilient pad 342 desirably may be a softly-inflated rubber tire.

It is to be noted that the particular form of grapple illustrated in FIGS. 2 and 3, or the different form of grapple illustrated in FIG. 1, and still other grapples described in the parent application, all have utility when used with other than the overall pipe laying apparatus of FIG. 1. Any such grapple may be suspended, for example, from the arm of a backhoe or by a cable or other fastening from the end of various types of cranes. The particular form of grapple shown in FIGS. 2 and 3 is especially suitable for use in moving concrete pipe within a storage yard or to and from a delivery vehicle.

Also affixed to the grapple assemblage of FIGS. 2 and 3 is a vibrator 360. In this particular embodiment, vibrator 360 conveniently is secured to the outside of the bight of the generally J-shaped structure which constitutes jaw 344. As embodied, vibrator 360 is driven hydraulically, in order to take advantage of the hydraulic power available on the overall machine of FIG. 1. However, an electric or air motor-driven vibrator also can be employed in the alternative, with successful results.

The internal essential components of vibrator 360, for the specifically illustrated embodiment, are shown in FIG. 4. Hydraulic fluid inletted through a hose 362 impinges against a circumferentially-spaced series of radial vanes 364 carried by a rotor 366. Rotor 366 is mounted on a spindle 368 for rotation within bearings one of which is indicated at 370 as projecting into the interior of the casing of the overall vibrator assembly. Clamped onto spindle 368 by bolts 372 are a pair of rotationally-aligned eccentrically-disposed weights 374. The return to the hydraulic system of the injected fluid is allowed by a hose 376.

As illustrated, pipe section 348 has a necked-down portion 380 at the end of the pipe section opposite bell 381 and into which is recessed a resilient O-ring 382. In joining a succession of pipe sections 348, each end portion 380 is to be matably inserted within the bell 381 of the previous pipe section so that O-ring 382 provides a seal between the two successive pipe sections. As is typical, it is preferred, before a joinder, that O-ring 382 be coated with a lubricant such as an industrial soap.

Returning for a moment to operation of the apparatus as depicted in FIG. 1, the operator seated on chair 58 manipulates the various control levers to drive the apparatus along a previously-established trench. Assuming that a section of pipe already has been laid in trench 34, the operator then manipulates crane 44 and grapple 54, which may be of any kind but which is provided with a vibrator such as described in more detail with respect to FIGS. 2-4, so as to pick up a new section of the pipe either from alongside trench 34 or, particularly for pipes of smaller diameter, from a bunk disposed on platform 130 above track 38 as described in the parent application. A second machine may be required only for the purpose of having previously disposed the pipe sections either in advance alongside trench 34 or in such a bunk disposed directly on the apparatus. Other refinements may also be included on the main pipe laying apparatus as described in the parent application.

Still assuming that a pipe section previously has been laid in the trench as specifically illustrated in FIG. 1, the next section of pipe is picked up and crane 44 is then manipulated to deposit that next section in line in the trench. On the other hand, the crane may be moved entirely to what would be the rear of the unit as viewed in FIG. 1 and caused to lay and manipulate the pipe in a direction away from the forward direction of the apparatus.

In either case, the operator is so situated as to be able at all times to observe the grapple. Moreover, his control station is so located that he can watch the pipe section during the entire extent of its lowering within trench 34. When the apparatus is adapted for use with respect to extremely deep trenches, control station 56 desirably is moved more to the center of the carriage 36 than illustrated, so as to insure complete control with vision at all stages of operation.

As noted, the pipe sections typically include sealing rings 382, of neoprene or the like, that complete the seals between the successive sections upon insertion of one section into the next. The manipulation of crane 44 and of the overall apparatus is sufficiently flexible that the single operator located in chair 58 may not only pick up the next section of pipe and place it within the trench but also may control the next section of pipe as to insert its adjoining end into the previously-laid pipe as he completes the placement of the following section. Accordingly, for many types of pipe installation, a single operator may perform the entire operation, both the pipe laying and successive joinder, without the need for anyone down in trench 34. That operation includes laying the pipe to grade, aligning successive sections and bedding the pipe in place.

Whatever the actual kind of pipe being laid and the particular form of apparatus being used to manipulate the pipe, the usual approach is to plant the pipe atop an underlying layer of bedding gravel. When that bedding gravel has not been first deposited with exactitude as to level and grade, the apparatus permits the operator to sort of wiggle the pipe section being laid, either laterally, up and down or both, in order to cause it to assume its finally desired position. At the same time, such "wiggling" assists in being able to insert the one end 380 within the next bell 381.

Whenever there is a slight disparity in mating diameters, it will be found that there may be some difficulty in effecting the insertion of O-ring 382 within the next bell 381. As a practical matter, moreover, one difficulty encountered, in an attempt to make such an insertion, arises by reason of the lodging within the next succeeding bell of a few pebbles or stones of the bedding gravel. Of course, that problem can be obviated by disposing a worker within the trench to make sure that the bell section has been throughly cleaned of impediments immediately prior to the time of insertion of the lead portion of the next pipe section. Besides the fact that this involves use of an additional person, it is preferred for safety reasons not to have anybody down in the trench.

The inclusion of vibrator 360 overcomes such problems and deficiencies. Activation of vibrator 360, during the pipe insertion operation, induces a vibrational component in the direction along the axis of or along the length of pipe section 348. It has been found that such longitudinally-induced vibration readily enables O-ring 382 to be moved into its position for proper sealing engagement within the adjoining bell 381. Besides being just a matter of "wiggling" a component so as to gain the final seated position desired, it has been observed that comparatively large stones within the bedding gravel mix, such as up to a diameter of one-inch or so, are pulverized as the leading edge of necked-down portion 380 is moved into place. Yet, the achievement of such pulverizing action does not in normal operation require the development of vibratory forces of more than comparatively minor magnitude.

In using an air driven vibrator operating at around forty-five pounds per square inch supplied air pressure, and in which a grapple as shown in FIGS. 2 and 3 was laying twenty-seven-inch inside-diameter re-enforced concrete pipe sections each of which weighed about twenty-six-hundred pounds, the air-driven version of vibrator 360 effected the necessary pulverization of stones included within the next bell section. The casing of that air motor only had an external diameter of about six inches and weights 374 thus were correspondingly small. The length of its spindle 368 was similar in dimension. The point is that only a comparatively small magnitude of vibration is necessary to induce the necessary momentum into pipe section 348 in order not only to move seal 382 within the next bell section but also to cause the crushing and pulverization of any stones which get in the way.

As mentioned above, the initially-deposited bedding gravel ordinarily will not define an upwardly-facing surface which is exactly at the ultimately desired level and grade. As a practical matter, the operator usually will desire to have a slight excess of bedding gravel and then "wiggle" the pipe downwardly to its ultimate resting position. The inclusion of vibrator 360 on the grapple aids that operation significantly.

It will be observed that vibrator 360 as herein embodied also has a component of vibration which is induced into the grapple in a vertical direction. In laying a forty-two inch diameter concrete pipe section and bedding it into a bedding composed of aggregate having stone sizes individually up to about one inch in diameter, activation of vibrator 360 allowed the operator to settle the pipe section being handled approximately two inches down into that bedding material. When so implanted under vibration to its final resting position, the underlying gravel material desirably was compacted to maximize its density and thus serve to prevent any further settling of the heavy pipe.

It will thus be observed that vibrator 360 is herein relied upon primarily for inducing vibration both in vertical and horizontal directions for two different respective purposes. On the other hand, an eccentrically-weighted vibrator of the kind specifically shown is in reality a "shaker" that operates in all directions within a generally vertical plane.

It also is contemplated to induce vibration in other planes relative to the longitudinal axis of the pipe. For any given type of pipe and kind of connection joint, a modest amount of orientational variation is commended for the purpose of determining the optimum mode of vibration for most easily joining a particular pipe version. Considering that one installation may involve the laying of many miles of pipe, the expenditure of a small amount of time to determine the best mode may be very advantageous. So far, however, the illustrated arrangement has been found to be quite satisfactory.

The use of such a shaker is believed to be best for accomplishing the desired results as to both of the primary functions of joining the pipe sections and also bedding a section as it is being laid. Nevertheless, it is contemplated that other kinds of vibrators may be employed. For example, known vibration inducers include reciprocating mechanical devices (e.g., jack hammers) and electrically-operated transducers that similarly induce vibration in a single direction.

In principle, either of those or any other kind of vibration-inducement device could be substituted for the rotary apparatus specifically illustrated. If restricted to inducing vibration only in a given direction, a pair of such devices could be employed to impart vibration both in longitudinal and vertical directions as is most desired for accomplishing both pipe joinder and bedding of a section of pipe being laid. In this connection, it is to be noted that applicant has discovered that the magnitude of vibrational force required, for either main purpose, is not large. It is not a matter of simple use of brute force to pound something into place.

The distinction between such brute-force pounding or tamping and an eased slipping of end 380 and O-ring 382 into place within the preceding end bell 381 appears to reside in the use of a frequency of vibration which is more rapid than the rate at which resilient O-ring 382 rebounds from each compression thereon. In using a hydraulically-powered form of vibrator 360, for example, it has been found that a hydraulic pressure of less than one-thousand pounds per square inch is sufficient to provide a rotation rate of eccentric weights 374 of up to three-thousand revolutions per minute. Of course, that translates to a vibration rate of up to three-thousand cycles per minute. On the other hand, it has been found that a neoprene O-ring of approximately one-inch diameter and surrounding a pipe section of about forty-two inches diameter exhibits a rate of rebound to its original condition, after each compression, of a lesser amount. Thus, as the joints are being mated, O-ring 382 is always under at least some degree of compression, and it appears that this allows the O-ring more easily to be slipped over any remaining granules of the bedding gravel that otherwise might tend to interfere with completion of the joinder. Those particles of the bedding gravel not pulverized are at least moved out of the way of the completion of the seal between O-ring 382 and the interior of a bell 381. Of course, the use herein of the term "O-ring" is merely exemplary. To serve as a seal, it may have other than a circular cross section.

In any case, it is preferred that the rate of vibration be selectively adjustable. With an hydraulically operated system as specifically shown, this is only a matter of adjusting the degree of opening of a valve at the control station. Changing the rate of vibration, for a given situation and type of pipe, will be found quickly by the operator to result in achieving maximum efficiency in both joinder of successive pipe sections and bedding of those sections. Moreover, the operator may find it best to change the vibration rate as between joinder and bedding.

It will thus be seen that an improvement has been made upon the apparatus specifically disclosed in the parent application. Use of the teachings newly presented herein enables an improvement both in the joinder of successive pipe sections and also in the implanting of any given pipe section upon an underlying material such as bedding gravel. At the same time, it is to be emphasized that the improvement herein presented is not limited to the use of the machine of FIG. 1 for accomplishing the basic pipe-laying task. The term "crane", therefore, is defined to include any means for suspending or otherwise holding the grapple or similar device that grabs the pipe section being laid.

While particular embodiments of the invention have been shown and described, and a variety of modifications and additions have been suggested, it will be obvious to those skilled in the art that changes and modifications may be made without departing from the invention in its broader aspects. Therefore, the aim in the appended claims is to cover all such changes and modifications as fall within the true spirit and scope of that which is patentable.

I claim:

1. Apparatus for laying and joining successive sections of pipe, comprising:
   a vehicle movable over a course along which said pipe is to be laid;
   a crane carried on said vehicle and having an outer end portion movable both vertically and horizontally relative to said course;
   a controllable grapple mounted from said outer end portion and engageable with a section of said pipe, operation of said grapple together with said crane enabling a section of said pipe to be picked up, moved into position over and deposited along said course;
   a vibrator mechanically coupled to said grapple for inducing vibration into said grapple and from said grapple into a section of pipe carried thereby as an end of that carried section is slidably mated with another section of said pipe lying along said course;
   and in which said grapple includes a generally horizontal finger, a jaw spaced below said finger and having a size and shape to be inserted within the section of pipe for carrying the same and an element joining one end of said jaw to one end of said finger, said vibrator being affixed to said element.

2. Apparatus for joining successive sections of pipe, each of which includes on one end a resilient seal matable with a corresponding opposite end of a next section, comprising:
   said seal being compressible and exhibiting a rebound from compression occurring at a predetermined rate;
   means for holding and moving one section of said pipe relatively into mating engagement with a next section of said pipe and concomitant interengagement with said seal;
   and means for inducing vibration into one of said sections at a rate greater than said predetermined rate.

3. Apparatus as defined in claim 2 in which said inducing means is mounted on said holding means.

4. Apparatus as defined in claim 2 in which said inducing means imparts vibration in a direction longitudinally of said one section.

* * * * *